(12) United States Patent
Lee et al.

(10) Patent No.: US 9,026,154 B2
(45) Date of Patent: May 5, 2015

(54) METHOD AND APPARATUS FOR CHANGING FONT SIZE OF MESSAGE IN A MOBILE COMMUNICATION TERMINAL

(75) Inventors: Ki-Tae Lee, Seoul (KR); Soo-Ryeol Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1197 days.

(21) Appl. No.: 11/481,528

(22) Filed: Jul. 6, 2006

(65) Prior Publication Data

US 2007/0124501 A1 May 31, 2007

(30) Foreign Application Priority Data

Jul. 6, 2005 (KR) .................. 10-2005-0060518

(51) Int. Cl.
*G06F 17/21* (2006.01)
*G09G 5/26* (2006.01)
*H04M 1/725* (2006.01)

(52) U.S. Cl.
CPC ......... *H04M 1/72552* (2013.01); *G06F 17/214* (2013.01); *G09G 5/26* (2013.01); *H04M 1/72583* (2013.01)

(58) Field of Classification Search
USPC ........... 455/466; 709/246, 206; 345/168, 671; 715/780
See application file for complete search history.

(56) References Cited

U.S. PATENT DOCUMENTS

| | | | |
|---|---|---|---|
| 5,754,873 A | 5/1998 | Nolan | |
| 6,288,702 B1 * | 9/2001 | Tachibana et al. | 345/671 |
| 2001/0013875 A1 * | 8/2001 | Soohoo | 345/671 |
| 2002/0124026 A1 | 9/2002 | Weber | |
| 2002/0188637 A1 | 12/2002 | Bailey et al. | |
| 2004/0109020 A1 | 6/2004 | Song | |
| 2005/0039137 A1 * | 2/2005 | Bellwood et al. | 715/801 |
| 2005/0093826 A1 | 5/2005 | Huh | |
| 2005/0108661 A1 * | 5/2005 | Deeds | 715/865 |
| 2006/0041629 A1 * | 2/2006 | Lira | 709/206 |
| 2006/0227153 A1 * | 10/2006 | Anwar et al. | 345/660 |

FOREIGN PATENT DOCUMENTS

| | | |
|---|---|---|
| EP | 0 883 056 | 12/1998 |
| GB | 2 290 898 | 1/1996 |
| JP | 61211767 | 9/1986 |
| JP | 5143052 | 6/1993 |
| JP | 9073290 | 3/1997 |
| JP | 10105362 | 4/1998 |
| JP | 11085133 | 3/1999 |
| JP | 11143453 | 5/1999 |
| JP | 2001013945 | 1/2001 |
| JP | 2001312397 | 11/2001 |
| JP | 2003169125 | 6/2003 |

(Continued)

OTHER PUBLICATIONS

Sony Ericsson P910i User Guide, Dec. 2004.

(Continued)

*Primary Examiner* — Ariel Balaoing
(74) *Attorney, Agent, or Firm* — The Farrell Law Firm, P.C.

(57) ABSTRACT

A method and an apparatus for enlarging a message in a mobile communication system is provided. Selection of a font size change menu is monitored during message writing or reading. If the font size change menu is selected, a pop-up window or a magnifier window is invoked and a message is enlarged in the pop-up or magnifier window.

13 Claims, 6 Drawing Sheets

(56) References Cited

FOREIGN PATENT DOCUMENTS

| JP | 2004185370 | 7/2004 |
|---|---|---|
| KR | 10-2003-0002532 | 1/2003 |
| KR | 10-2004-0049487 | 6/2004 |
| KR | 10-2004-0092797 | 11/2004 |
| KR | 1020050002469 | 1/2005 |
| KR | 10-2005-0015897 | 2/2005 |
| RU | 2 267 151 | 3/2004 |
| WO | WO 02/082287 | 10/2002 |
| WO | WO 2004/109020 | 12/2004 |

OTHER PUBLICATIONS

Russian Office Action dated Mar. 24, 2009 issued in counterpart Appln. No. 2008104419/09.

* cited by examiner

METHOD AND APPARATUS FOR CHANGING FONT SIZE OF MESSAGE IN A MOBILE COMMUNICATION TERMINAL

PRIORITY

This application claims priority under 35 U.S.C. §119 to an application entitled "Method of Changing Font Size of Message in a Mobile Communication Terminal" filed in the Korean Intellectual Property Office on Jul. 6, 2005 and assigned Serial. No. 2005-60518, the contents of which are incorporated herein by reference.

BACKGROUND OF THE INVENTION

1. Field of the Invention

The present invention relates generally to a method and an apparatus for changing the font size of a message in a mobile communication terminal, and in particular, to a method and apparatus for enlarging the text of a message so that the message is easy to view during writing an outgoing message or reading an incoming message in a mobile communication terminal.

2. Description of the Related Art

Due to the widespread use of mobile communication terminals, service providers and terminal manufacturers have been developing more convenient, special features to attract more users. For example, mobile communication terminals now are equipped with the functions of a phonebook, games, a scheduler, a Short Message Service (SMS), Internet, e-mail, morning or wake-up calls, an MPEG Layer 3 (MP3) player, and a digital camera.

One of the most popular functions is SMS. Recently, SMS has gained popularity over voice calls, especially among teenagers. Besides SMS, multimedia messages are available, including pictures, ring tones, video clips, and the like. Hence, the market for the mobile communication terminal has been further growing rapidly.

In most countries, the SMS message is limited to some bytes (16 bytes in Korea) of text to each line, equivalent to some English characters (16 bytes in Korea), and a font size is limited also, to spare space for emoticons.

Because of the limited display size and the limited font size, vision impaired people have difficulty in reading a message during writing an outgoing message or reading an incoming message. When the font size is changed randomly, it in turn changes the layout of emoticons, disfiguring the emoticons. Hence, the font size is limited.

SUMMARY OF THE INVENTION

An object of the present invention is to substantially solve at least the above problems and/or disadvantages and to provide at least the advantages below. Accordingly, an object of the present invention is to provide a method of enabling a user to easily read a message by changing the font size of the message in a mobile communication system.

According to one aspect of the present invention, in a method of enlarging a message in a mobile communication system, selection of a font size change menu is monitored during message writing. If the font size change menu is selected, an enlarged entry window is displayed and a message is entered in the enlarged entry window.

According to another aspect of the present invention, in a method of enlarging a message in a mobile communication system, selection of a font size change menu is monitored during message reading. If the font size change menu is selected, all or part of the message to be enlarged is selected and enlarged in a pop-up window or in a magnifier window.

According to another aspect of the present invention, an apparatus for enlarging a message in a mobile communication system comprises a controller for monitoring selection of a font size change menu during message writing, outputting an enlarged entry window for entering a message with an enlarged font, if the font size change menu is selected, and a display means for displaying font size change menu and the enlarged entry window.

According to another aspect of the present invention, an apparatus for changing a font size of a message in a mobile communication system comprises a controller for selecting a font size change menu during reading a message, selecting a part of the message to be changed in a font size and changing the font size of the selected message part in a window, and a displaying means for displaying the font size change menu and the window

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a technique for increasing the readability of a message by changing the font size of the message during writing or reading a message. The message includes an SMS message, e-mail, a Multimedia Message System (MMS) message, and an Enhanced Message Service (EMS) message.

Figure 1:
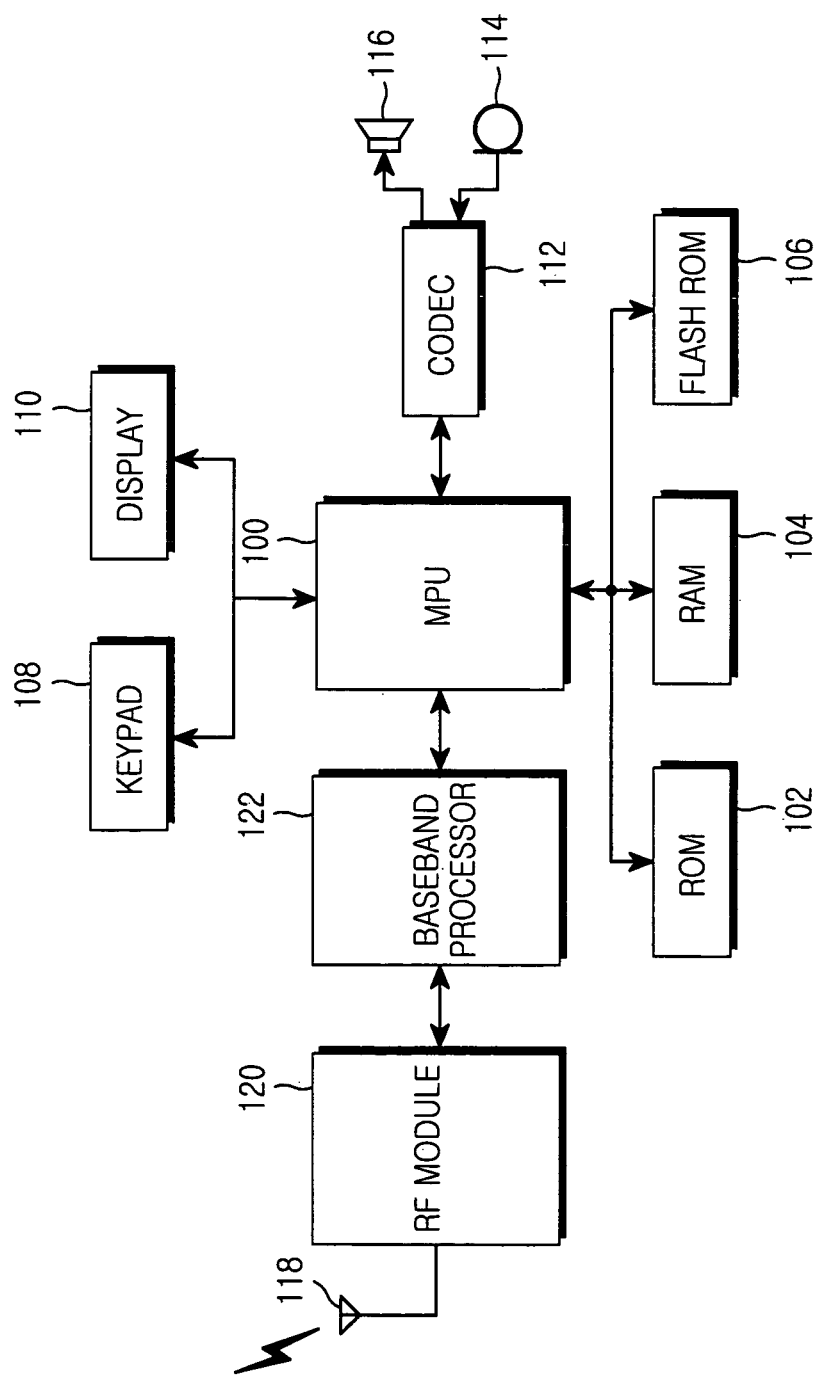
FIG. 1 is a block diagram of a mobile communication terminal according to the present invention.

FIG. 1 is a block diagram of a mobile communication terminal according to the present invention. The mobile communication terminal can include, but is not limited to, any of a cellular phone, a Personal Communication System (PCS) terminal, a Personal Data Assistant (PDA), and an International Mobile Telecommunication 2000 (IMT 2000) terminal. The following description is made in the context of a typical configuration of the mobile communication terminal.

Referring to FIG. 1, a Micro-Processor Unit (MPU), acting as a controller, 100 provides overall control to the mobile communication terminal. Specifically, it processes and controls voice and data communications. In addition to the typical functions, the MPU 100 controls change of the font size for a message by use of a pop-up window or a magnifier window. The typical processing and control operation of the MPU 100 will not be described herein. In the description below, one page is defined as the entire text viewed at one time on a screen.

A Read Only Memory (ROM) 102 stores the microcodes of programs used for processing and control of the MPU 100, and reference data. Particularly, it stores a program for displaying a message in an increased font size in a pop-up window or a magnifier window according to the present invention. A Random Access Memory (RAM) 104 serves as a working memory for the MPU 100, for temporarily storing data generated during execution of each program. A flash ROM 106 stores updatable data to be kept, such as a phonebook and outgoing and incoming messages.

A keypad 108 is provided with alphanumeric keys, and function keys including Menu, Cancel (Clear), Talk, End, OK, Internet, and navigation (or directional) keys (▲/▼◄/►). It provides key input data corresponding to a user-pressed key to the MPU 100. A display, sometimes referred as a display means, 110 displays status information created during the operation of the mobile communication terminal, a limited number of characters, moving pictures, and still images. The display 110 may be comprised of a Liquid Crystal Display (LCD).

A Coder-Decoder (CODEC) 112 connected to the MPU 100, and a speaker 116 and a microphone 114 which are connected to the CODEC 112 collectively form a voice input/output block for voice call and voice recording. The CODEC 112 converts Pulse Code Modulation (PCM) data received from the MPU 100 to an analog voice signal and outputs the analog voice signal through the speaker 116. Also, it converts a voice signal received through the microphone 114 to PCM data and provides the PCM data to the MPU 100.

A Radio Frequency (RF) module 120 downconverts an RF signal received through an antenna 118 to a baseband signal and provides the baseband signal to a baseband processor 122. It also upconverts a baseband signal received from the baseband processor 122 to an RF signal and sends the RF signal through the antenna 118. The baseband processor 122 processes a baseband signal transmitted/received between the RF unit 120 and the MPU 100. For example, the baseband processor 122 channel-encodes and spreads data during transmission and despreads and channel-decodes a signal during reception.

Also, an apparatus for enlarging a message in a mobile communication system may comprise a controller for monitoring selection of a font size change menu during message writing, outputting an enlarged entry window for entering a message with an enlarged font, if the font size change menu is selected, and a display means for displaying font size change menu and the enlarged entry window. Here, the enlarged entry window is a pop-up window.

Also, an apparatus for enlarging a message in a mobile communication system may comprise a controller for monitoring selection of a font size change menu during message reading, selecting a part of the message to be enlarged, if the font size change menu is selected, and outputting the selected message part with an enlarged font size in one of a pop-up window and a magnifier window, and a displaying means for displaying the font size change menu and one of the pop-up window and the magnifier window.

Also, an apparatus for changing a font size of a message in a mobile communication system may comprise a controller for selecting a font size change menu, outputting a font size changing window, and entering a message with a changed font size in the font size changing window, and a displaying means for displaying the font size change menu and the font size changing window. Here, the font size change window is a pop-up window.

Also, an apparatus for changing a font size of a message in a mobile communication system may comprise a controller for selecting a font size change menu during reading a message, selecting a part of the message to be changed in a font size and changing the font size of the selected message part in a window, and a displaying means for displaying the font size change menu and the window.

Figure 2:
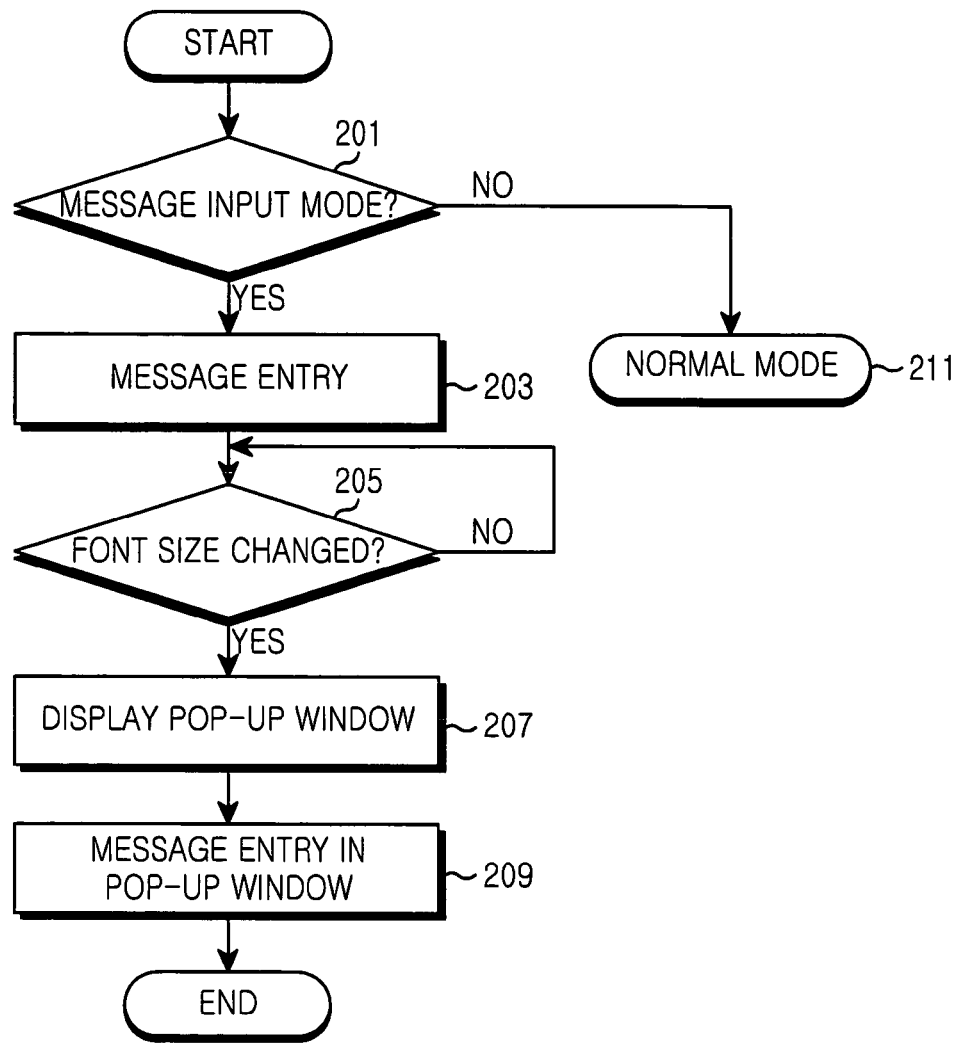
FIG. 2 is a flowchart illustrating an operation for writing an outgoing message in an enlarged view according to the present invention.
Figure 3:
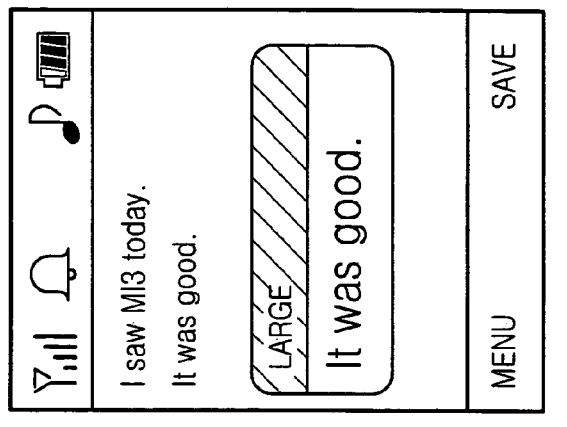
FIGS. 3A, 3B and 3C are screen displays sequentially illustrating message writing in an increased font size according to the present invention.
Figure 3:
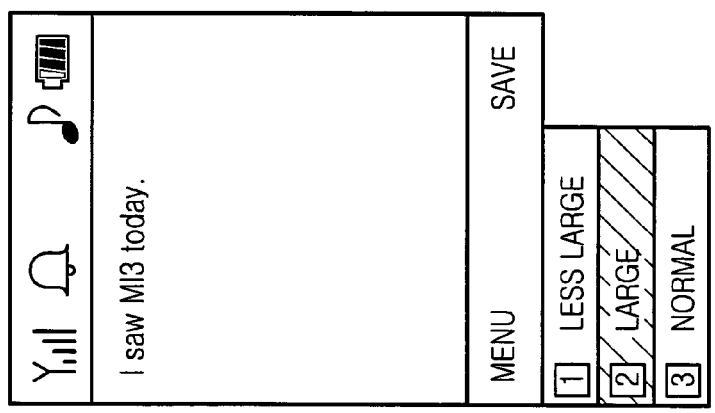
Figure 3:
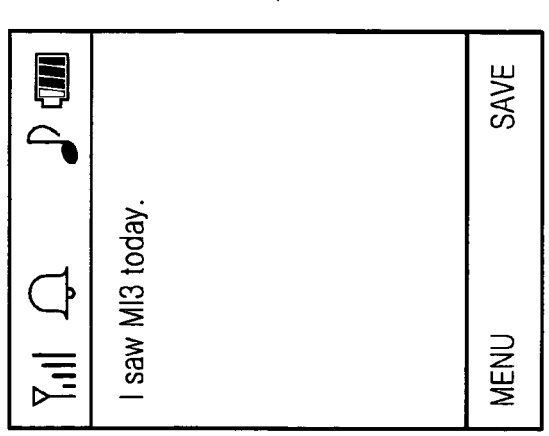

FIG. 2 is a flowchart illustrating an operation for writing a message in an increased font size according to the present invention, and FIGS. 3A, 3B and 3C are screen displays sequentially illustrating the message writing in an increased font size in a pop-up window.

Referring to FIG. 2, the MPU 100 monitors selection of a message input mode by key input from the user in step 201. If the message input mode is not selected, the MPU 100 performs a normal mode operation (e.g. idle mode) in step 211.

Upon selection of the message input mode, the MPU 100 receives text for a message in step 203, as illustrated in FIG. 3A. During the message writing, the MPU 100 monitors selection of a font size change menu item (e.g. less large or large) by user-key manipulation in step 205, as illustrated in FIG. 3B.

Upon selection of the font size change menu item, the MPU 100 displays a pop-up window for message entry in an increased font size in step 207, as illustrated in FIG. 3C, and continuously displays the entered message in the pop-up window in step 209. The pop-up window is displayed over an original message entry window illustrated in FIG. 3A. For example, if the user enters "I saw MI3 today" in the pop-up window, it is also displayed on the underlying original message entry window.

After the message is completely written, the MPU 100 ends the algorithm.

In the above embodiment for enlarged message entry, two font size change menu items are available, for example, "less large" and "large", as illustrated in FIG. 3B. If "less large" is selected, the pop-up window for enlarged message entry is displayed and each character is enlarged, for example, 1.5 times the normal font size (16 bytes per line equivalent to 16 English characters), as illustrated in FIG. 3C.

If "large" is selected, the same operation is performed, except that each character is enlarged, for example, twice the normal font size.

Figure 4:
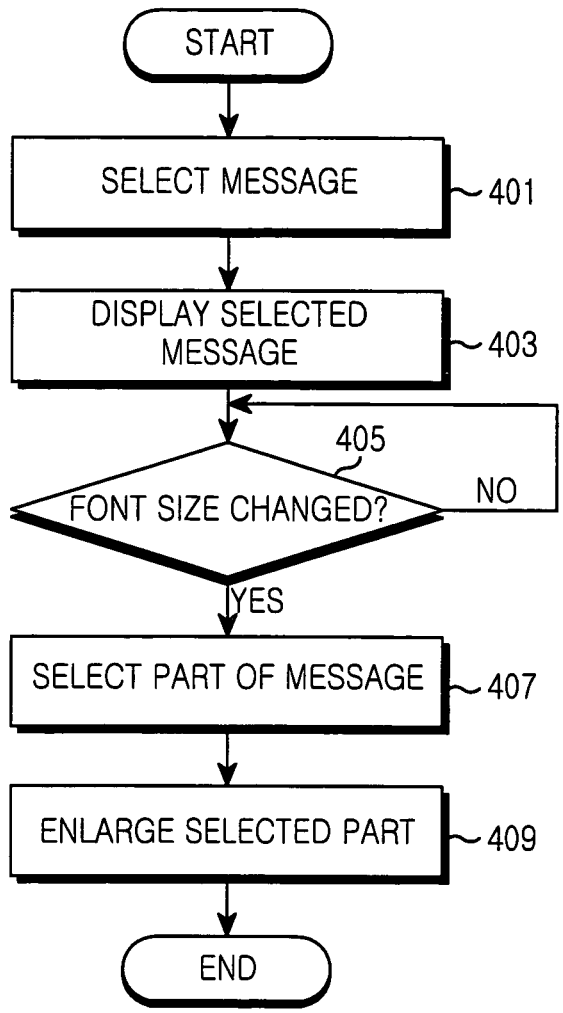
FIG. 4 is a flowchart illustrating a procedure for reading an incoming message in an increased font size according to the present invention.

FIG. 4 is a flowchart illustrating a procedure for reading a message in an increased font size according to the present invention.

Referring to FIG. 4, upon user-selection of an incoming message by key manipulation in step 401, the MPU 100 displays the selected message on the display 110 in step 403.

In step 405, the MPU 100 monitors selection of a font size change menu item (e.g. 1. magnifier, 2. large view).

Upon selection of a font size change menu item, the MPU 100 selects all or part of the displayed message to be enlarged according to user-key manipulation in step 407 and enlarges the selected part in a pop-up window or a magnifier window on the display 110 in step 409.

Figure 5:
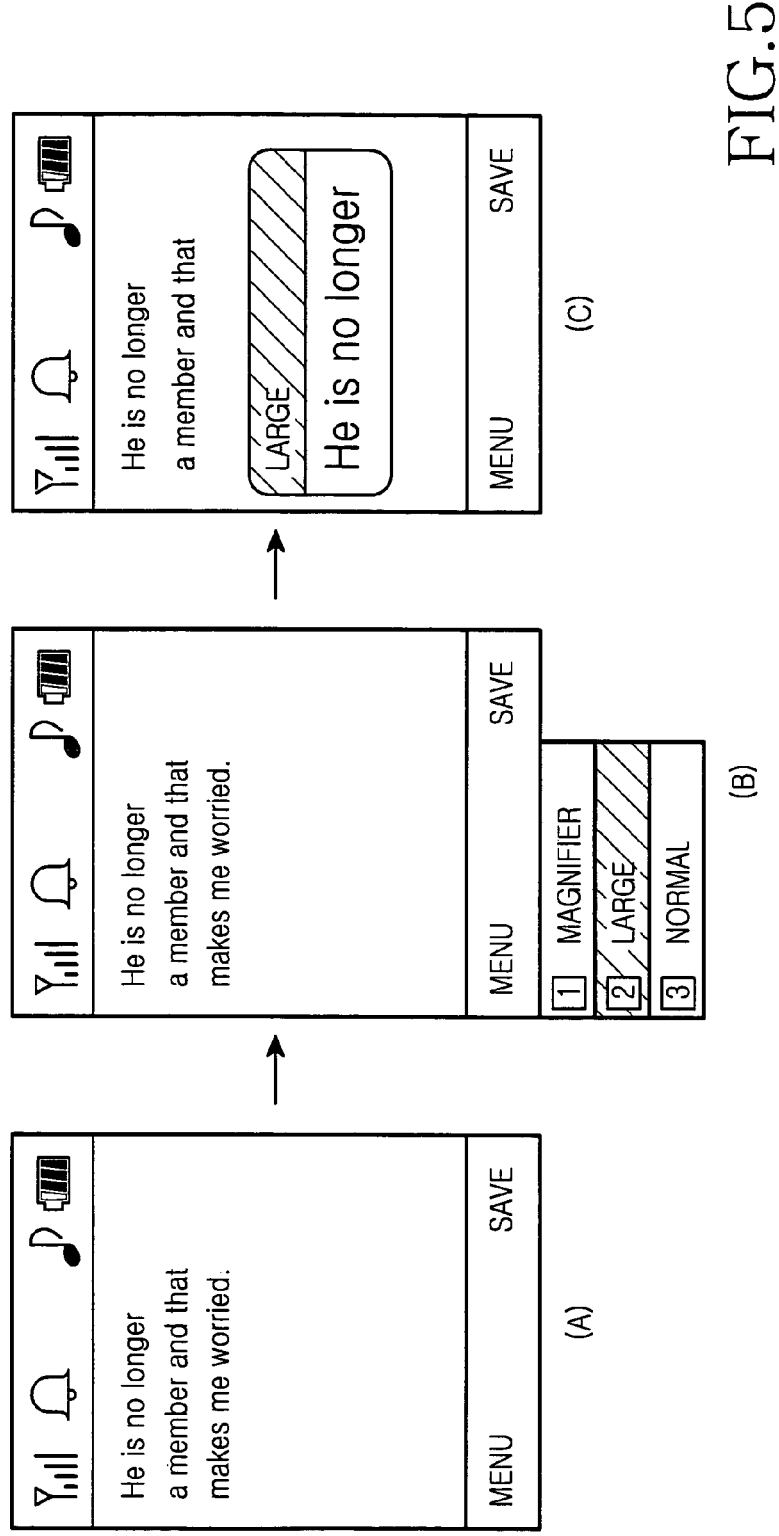
FIGS. 5A, 5B and 5C are screen displays sequentially illustrating message reading in an increased font size according to the present invention.
Figure 6:
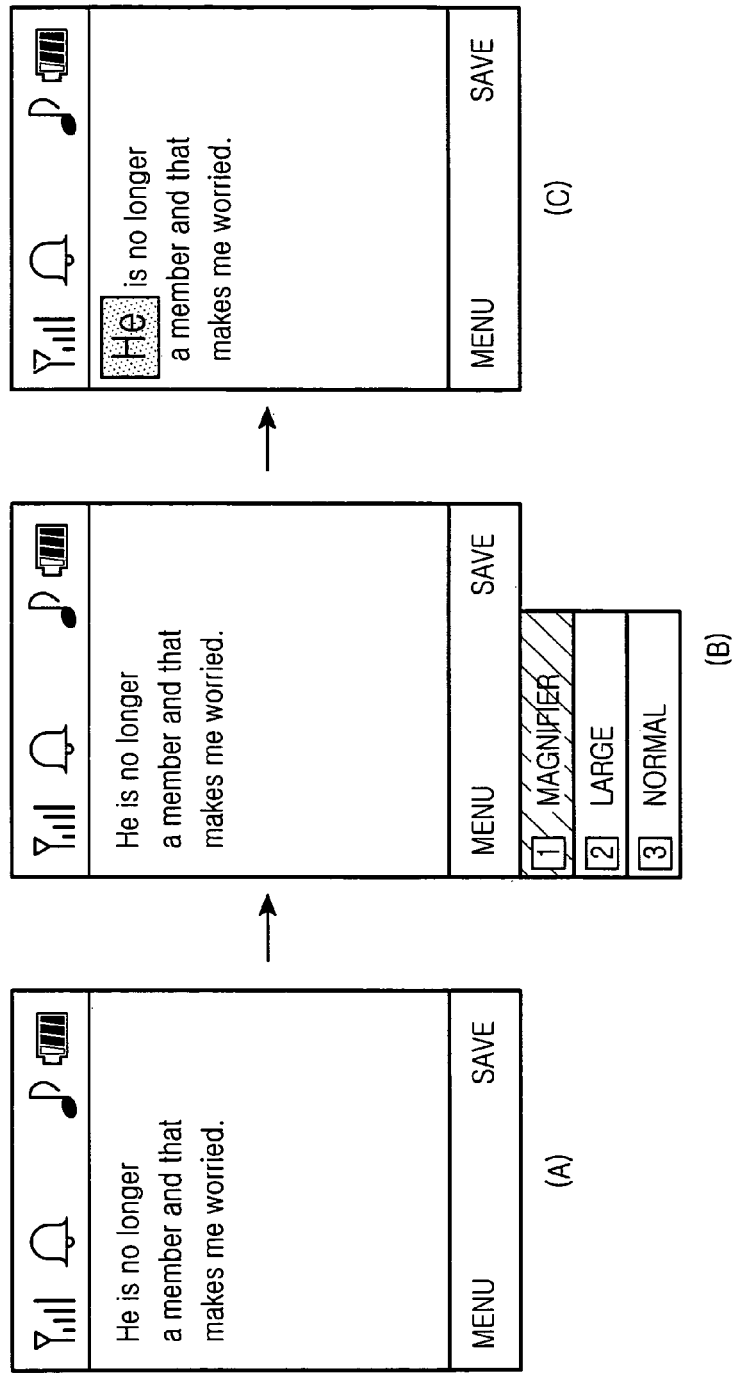
FIGS. 6A, 6B and 6C are screen displays sequentially illustrating message reading in an increased font size according to the present invention.

FIGS. 5A, 5B and 5C are screen displays sequentially illustrating message reading in a pop-up window and FIGS. 6A, 6B and 6C are screen displays sequentially illustrating message reading in a magnifier window.

Referring to FIGS. 5A, 5B and 5C, upon user-selection of a message, it is displayed on the display 110, as illustrated in FIG. 5A. When the user selects a menu item "large view", part of the message to be zoomed in is selected (e.g. the firs line: "He is no longer"), as illustrated in FIG. 5B. As illustrated in FIG. 5C, a pop-up window is invoked and the selected part is enlarged on the display. Preferably, the menu item "large view" is used to enlarge a message on a line-by-line basis. When the user scrolls from the selected line by a directional key (▲/▼/◄/►), the next line or the previous line is enlarged, for reading.

Referring to FIGS. 6A, 6B and 6C, upon user-selection of a message, it is displayed on the display 110, as illustrated in FIG. 6A. When the user selects a menu item "magnifier", as illustrated in FIG. 6B, the message is preferably magnified on a word-by-word basis, as illustrated in FIG. 6C. The user can read the message continuously by the magnifier using the directional keys (▲/▼/◄/►). The menu item "magnifier" is used to magnify a selected word or sentence through a magnifier window in a message displayed on the display 110.

As described above, the present invention improves readability of a message by enlarging characters of a predetermined size in a pop-up window or a magnifier window, while complying with an existing message entry rule for emoticons in a mobile communication system.

Also, a method of changing a font size of a message in a mobile communication system may comprises the steps of selecting a font size change menu, displaying a font size changing window and entering a message with a changed font size in the font size changing window.

Also, a method of changing a font size of a message in a mobile communication system may comprise the steps of monitoring selection of a font size change menu during writing a message and displaying a font size changing window, if the font size change menu is selected and entering a message with a changed font size in the font size changing window.

Also, a method of changing a font size of a message in a mobile communication system may comprise the steps of selecting a font size change menu during reading a message, selecting a part of the message to be changed in a font size and changing the font size of the selected message part in a window. Here, the window may change the message on one of a word-by-word basis and a sentence-by-sentence basis.

Also, a method of changing a font size of a message in a mobile communication system may comprise the steps of monitoring selection of a font size change menu during message reading, selecting a part of the message, if the font size change menu is selected, and changing the font size of the selected message part.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of enlarging a message in a mobile communication system, the method comprising the steps of:
   detecting a selection of a font size change menu while displaying an original message entry window for entry of the message in a message input mode;
   displaying an enlarged entry window, in response to detection of the selection of the font size change menu while displaying the original message entry window in the message input mode; and
   entering the message in the enlarged entry window,
   wherein, when the message is entered in the enlarged entry window, the message is entered in the original message entry window, and
   wherein a font size of the message in the enlarged entry window is greater than a font size of the message in the original message entry window.

2. The method of claim 1, wherein the font size change menu has at least two menu items, a first menu item being selected for enlarging the message 1.5 times a normal font size and a second menu item being selected for enlarging the message 2 times the normal font size.

3. The method of claim 1, wherein the enlarged entry window is a pop-up window.

4. The method of claim 1, wherein the message is one of an SMS message, e-mail, a Multimedia Message System (MMS) message, and an Enhanced Message Service (EMS) message.

5. A method of changing a font size of a message in a mobile communication system, the method comprising the steps of:
   detecting a selection of a font size change menu while displaying an original message entry window for entry of the message in a message input mode;
   displaying a font size changing window, in response to detection of the selection of the font size change menu while displaying the original message entry window in the message input mode; and
   entering the message with a changed font size in the font size changing window,
   wherein when the message is entered in the font size changing window, the message is entered in the original message entry window, and
   wherein a font size of the message in the font size changing window is different from a font size of the message in the original message entry window.

6. An apparatus for enlarging a message in a mobile communication system, the apparatus comprising:
   a controller for detecting a selection of a font size change menu while displaying an original message entry window for entry of the message in a message input mode, outputting an enlarged entry window for entering the message with an enlarged font, in response to detection of the selection of the font size change menu while displaying the original message entry window in the message input mode; and
   a displaying means for displaying the original message entry window, the font size change menu, and the enlarged entry window,
   wherein the controller enters the message in the enlarged entry window,
   wherein, when the controller enters the message in the enlarged entry window, the controller enters the message in the original message entry window, and
   wherein a font size of the message in the enlarged entry window is greater than a font size of the message in the original message entry window.

7. The apparatus of claim 6, wherein the enlarged entry window is a pop-up window.

8. An apparatus for changing a font size of a message in a mobile communication system, the apparatus comprising:
   a controller for detecting a selection of a font size change menu while displaying an original message entry window for entry of the message in a message input mode, outputting a font size changing window for entering the message with a changed font size, in response to detection of the selection of the font size change menu while displaying the original message entry window in the message input mode; and a displaying means for displaying the original message entry window, the font size change menu, and the font size changing window, wherein the controller enters the message in the font size changing window, wherein, when the controller enters the message in the font size changing window, the controller enters the message in the original message entry window, and wherein a font size of the message in the font size changing window is different from a font size of the message in the original message entry window.

9. The apparatus of claim 8, wherein the font size change window is a pop-up window.

10. The method of claim 1, wherein the message is simultaneously entered in the enlarged entry window and the original message entry window.

11. The method of claim 5, wherein the message is simultaneously entered in the font size changing window and the original message entry window.

12. The apparatus of claim 6, wherein the message is simultaneously entered in the enlarged entry window and the original message entry window.

13. The apparatus of claim 8, wherein the message is simultaneously entered in the font size changing window and the original message entry window.

* * * * *